Oct. 27, 1931.  H. O. HEM  1,829,516
WEIGHING AND COUNTING SCALE
Filed March 26, 1930
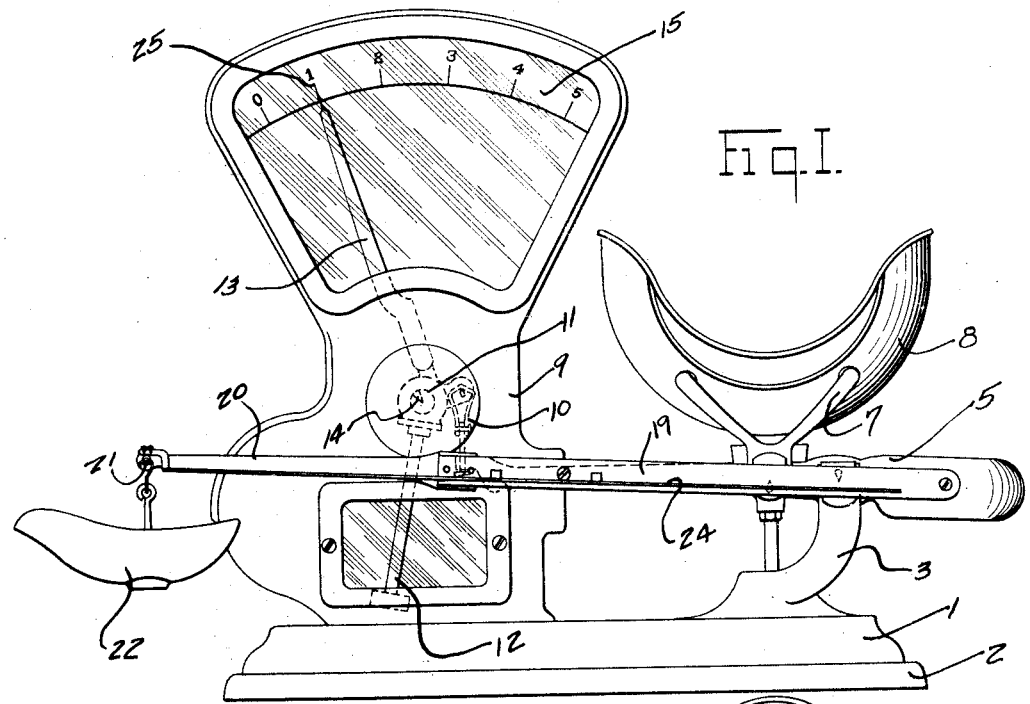
Fig. I.
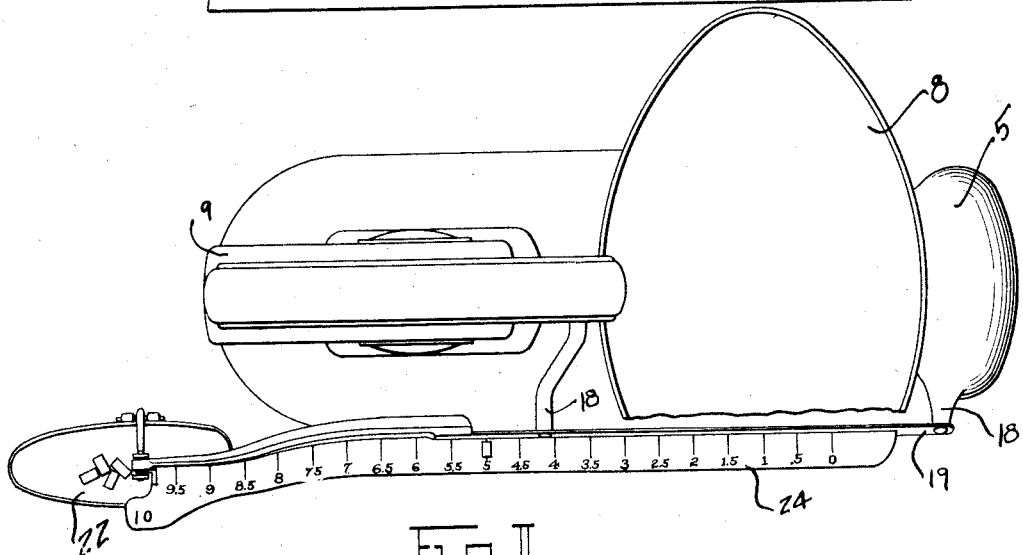
Fig. II.
Inventor
HALVOR O. HEM
By C. C. Marshall
Attorney Patented Oct. 27, 1931

1,829,516

UNITED STATES PATENT OFFICE

HALVOR O. HEM, OF TOLEDO, OHIO, ASSIGNOR TO TOLEDO SCALE MANUFACTURING COMPANY, OF TOLEDO, OHIO, A CORPORATION OF NEW JERSEY

WEIGHING AND COUNTING SCALE

Application filed March 26, 1930. Serial No. 438,969.

This invention relates to weighing and more particularly to scales for use in determining the relation that a number of substantially uniform parts bears to a given unit of weight.

In counting lots of articles of substantially uniform weight by means of the weighing method, the usual practice is to balance a known number of specimens of the articles to be counted against an unknown quantity in the commodity receiver which bears a fixed leverage ratio to the specimen pan, for example, 50 to 1 or 100 to 1. Thus in 50 to 1 ratio scale, one article in the specimen pan will balance fifty similar articles in the commodity receiver. However, it is always necessary in every counting operation to balance the parts in the commodity receiver by means of a number of similar parts in the specimen pan.

One of the principal objects of this invention is to provide a device for determining the number of articles whose weight is equivalent to a predetermined unit of weight.

Another object is the provision of a simple and effective device for determining the number of substantially uniform articles whose combined weight is equal to a predetermined unit of weight, as for example, one pound.

A further object is the provision of a device which may be used for weighing and counting as well as for determining the number of uniform articles contained in a unit of weight.

In the drawings:—

Figure I is a front elevational view of the weighing device of my invention.

Figure II is a top plan view of the device shown in Figure I having a part broken away.

Referring to the drawings in detail, I have shown my device as incorporated in a weighing scale of the so called fan type, but it is to be understood that the device of my invention may be changed or modified so as to make it adaptable for use with other types of machines without departing from the spirit of this invention.

The scale consists of a base 1 resting upon a sub-base 2, the base being formed at one end with a base horn or fulcrum stand 3 in the upper end of which is fulcrumed a lever 5. The lever 5 is also equipped with load pivots suitably supporting a skeleton spider 7, the latter in turn supporting a scoop-like commodity receptacle 8. The nose end of the lever 5 projects into a fan shaped upright housing 9 erected upon the other end of the base 1 and is connected by means of a stirrup or link 10 to a load counterbalancing and indicating mechanism comprising a hub structure 11, a pendulum 12 and an indicating hand 13, the parts being supported within the housing 9 by means of a pivot 14 on suitable bearings located within the housing 9. When the load counterbalancing mechanism is moved under the influence of a load placed in the commodity receiver 8, the indicating hand 13 is simultaneously moved over a graduated chart 15 and when the pendulum 12 has moved to a position counterbalancing the weight of the load, the graduation on the chart in registration with the indicating hand indicates the weight of the load. The foregoing description of the operation of my device illustrates its use as an ordinary weighing scale.

The lever 5 is formed with integral forwardly projecting fingers 18 to which is fixedly secured a bar 19, the latter provided with an extension 20. Fixed to the end of the extension 20 is a knife edge pivot 21 which supports a comparatively small receptacle or specimen pan 22. The distance from this pivot to the fulcrum is ten times as great as the distance between the fulcrum pivot and the pivot supporting the commodity receiver 8. It is therefore apparent that one article in the specimen pan 22 will have the same effect upon the load counterbalancing and indicating mechanism as ten similar articles in the commodity receiver 8. Secured to the bar 19 and the extension 20 is a flat strip 24. This strip extends at right angles to the aforesaid parts and forms a shelf. The upper surface of the member 24 is graduated and provided with denoting characters. The zero character is co-incident with the fulcrum line of the lever 5 and the first unit character is co-incident with a line through the pivots supporting the spider and the scoop-like commodity receiver 8 and the number of unit characters on this strip is always equal to the ratio between the specimen pan 22 and the commodity receiver 8. In this case this ratio is 1:10. It will be seen (Figure II) that the last unit character 10 is coincident with the pivot 21.

When it is desired to determine the number of substantially similar articles contained in one pound the operator places a number of parts in the specimen pan 22 until the indicator nearly points to the one pound mark 25 printed on the chart 15. He then places another article in the specimen pan 22 and if this article carries the indicator 13 beyond the one pound character 25 on the chart, he again removes it from the pan 22 and places it on the flat shelf 24 over the zero graduation and slowly moves it towards the left, stopping the movement of the article when the indicator points directly to the one pound graduation on the chart. He then counts the number of pieces in the pan 22 (in the illustration four pieces are shown) and multiplies this number by the ratio of the specimen pan to the commodity receiver, which in this case is 10. In other words, these four pieces represent 40 articles placed in the commodity receiver 8. He then reads the graduation over which the specimen remained on the flat graduated shelf 24. In this case the specimen balanced at 5 which is equivalent to 5 pieces in the commodity receiver 8. Adding these two numbers together, the result is 45. In other words, there are 45 similar pieces (in the example) contained in a pound. This number "45" may be marked on the bin in which these parts are kept in stock. In many manufacturing places it is customary to keep a record of the number of raw parts delivered so that a check can be had whether the number delivered were actually used. For that reason, it is desirable to also know the number of pieces delivered. The device embodying my invention permits the stockroom employees to easily and quickly determine both the total weight of the parts delivered and the number of pieces, as after the number of pieces per pound has been established by the device, it is only necessary in delivering larger quantities to multiply the number of pounds by the number of pieces per pound. This enables an accurate check to be had, not only on the assemblying departments, but also on the production departments.

While it will be apparent that the illustrated embodiment of my invention herein described is well calcuated, to adequately fulfill the objects primarily stated, it is to be understood that the invention is susceptible to variation, modification and change within the spirit and scope of the subjoined claims.

Having described my invention, I claim:

1. In a device of the class described, in combination, a frame, a lever fulcrumed thereon, load counterbalancing and indicating mechanism connected to said lever, commodity receiver supported on said lever, a specimen pan connected to said lever so that the weight of articles placed therein is offset by said load counterbalancing mechanism, a support connected to the lever and adapted to receive an article as a counter at different distances from the fulcrum pivot of the lever, said commodity receiver, specimen pan and support being located on the same side of the fulcrum of said lever.

2. In a device of the class described, in combination, weighing mechanism including a lever and load counterbalancing mechanism, a commodity receiver connected to the lever, a specimen pan also connected to the lever so that the weight of articles placed therein is offset by said load counterbalancing mechanism and means including a beam connected to the lever adapted to support an article as a counter at different distances from the fulcrum of said lever, said commodity receiver, specimen pan and beam acting on the same side of the fulcrum of said lever.

3. In a device of the class described, in combination, means for determining the number of similar articles whose combined weight is equal to a predetermined unit of weight comprising a frame, a lever fulcrumed thereon, load counterbalancing means and indicating mechanism, means comprising a stirrup connecting said load counterbalancing means and indicating mechanism, for co-operation, to said lever, an article support co-operating with said lever and adapted to receive an article as a counter at different distances from the fulcrum of said lever, the weight of said articles being offset by the load counterbalancing mechanism, said means for connecting said lever to said load counterbalancing means and indicating mechanism and said article support being on the same side of the fulcrum of said lever.

4. In a device of the class described, in combination, a frame, a lever fulcrumed upon said frame, load counterbalancing mechanism, a stirrup connecting said lever and said load counterbalancing mechanism, means for supporting an article as a counter comprising a graduated bar, bearing indicia, connected to the lever, the parts being so constructed and arranged that the weight of said article is offset by the load counterbalancing mechanism, said stirrup and said graduated indicia bearing bar being on the same side of the fulcrum of said lever.

5. In a device of the class described, in combination, a frame, a lever fulcrumed upon said frame, load counterbalancing mechanism and means comprising a stirrup connecting said load counterbalancing mechanism to said lever, a specimen pan connected to said lever, means for supporting an article as a counter comprising a graduated bar secured to the lever, the parts being so constructed and arranged that the weight of articles in the specimen pan and the article supported on the bar is offset by the load counterbalancing mechanism, said specimen pan and said means for supporting said counter, being on the same side of the fulcrum of said lever as said stirrup connecting said lever to said counterbalancing mechanism.

6. In a device of the class described, in combination, a frame, a lever fulcrumed thereon, a differential load counterbalancing element co-operating with said lever, an article receiver connected to the lever and means comprising an elongated trough-like member adapted to receive an article, said article receiver and said elongated trough-like member acting on said lever on the same side of its fulcrum.

7. In a device of the class described, in combination, a frame, a lever fulcrumed thereon, a differential load counterbalancing element co-operating with said lever, an article receiver connected to the lever and means comprising an elongated trough-like member adapted to receive an article, said article receiver and said elongated trough-like member acting on said lever on the same side of its fulcrum to determine the number of similar articles in a predetermined unit of weight.

8. In a device of the class described, in combination, means for determining the number of similar articles whose combined weight is equal to a predetermined unit of weight comprising a lever, load counterbalancing and indicating elements co-operating therewith, a receptacle for receiving a number of said similar articles connected to said lever, trough-like means bearing graduations and indicia carried by said lever for receiving one of said articles in different distances from the fulcrum of said lever, said receptacle and said trough-like means acting on the same side of the fulcrum of said lever.

HALVOR O. HEM.